Figure 5:
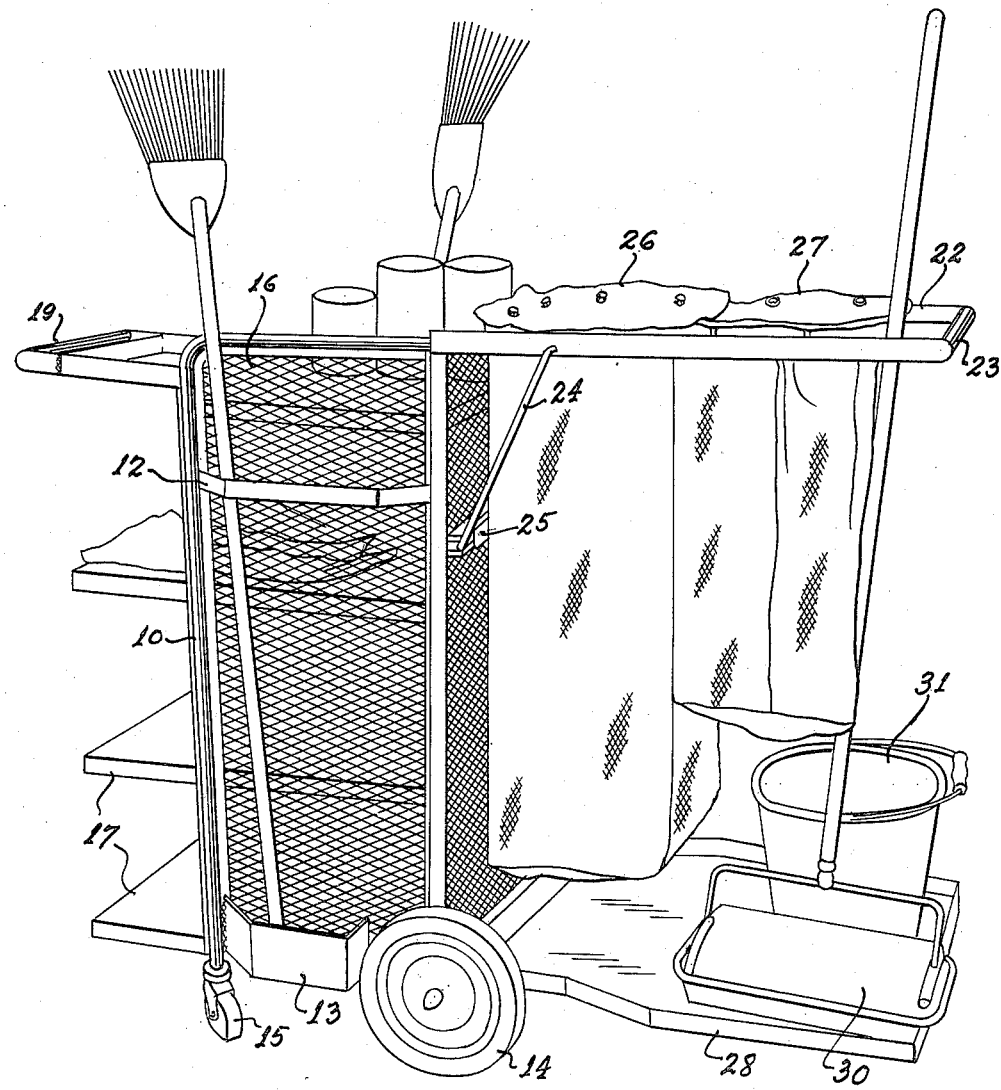

May 29, 1951     P. O. YOUNG     2,555,178
FOLDING MAID SERVICE TRUCK
Filed June 15, 1949     3 Sheets-Sheet 1
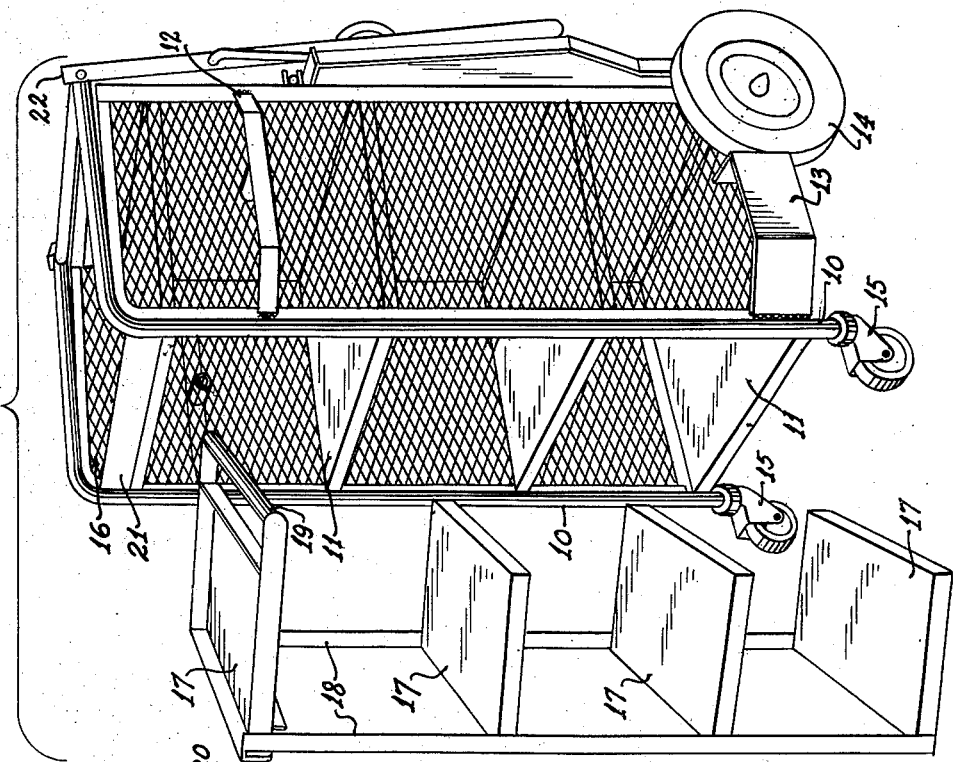
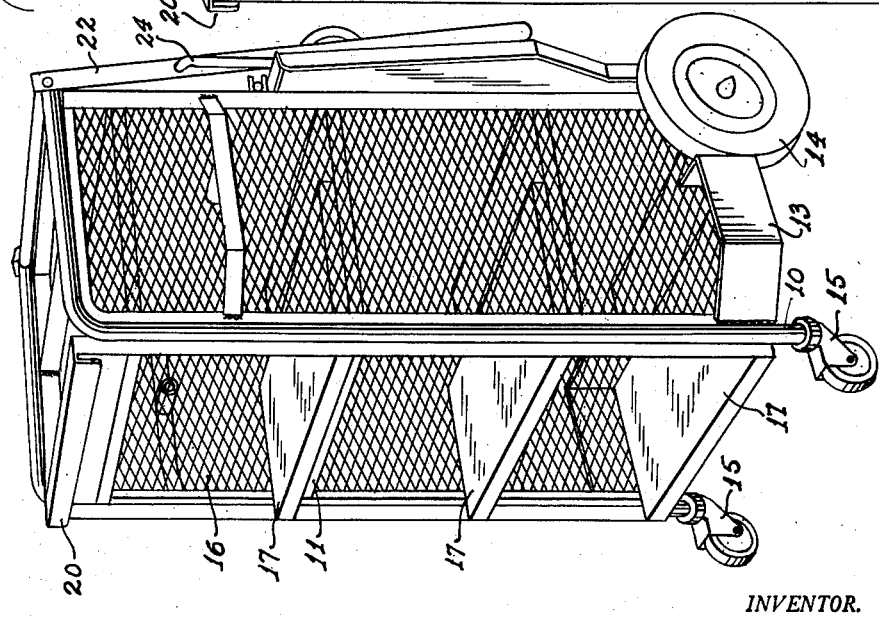
INVENTOR.
Paul O. Young
BY
ATTORNEY May 29, 1951  P. O. YOUNG  2,555,178
FOLDING MAID SERVICE TRUCK
Filed June 15, 1949  3 Sheets-Sheet 2
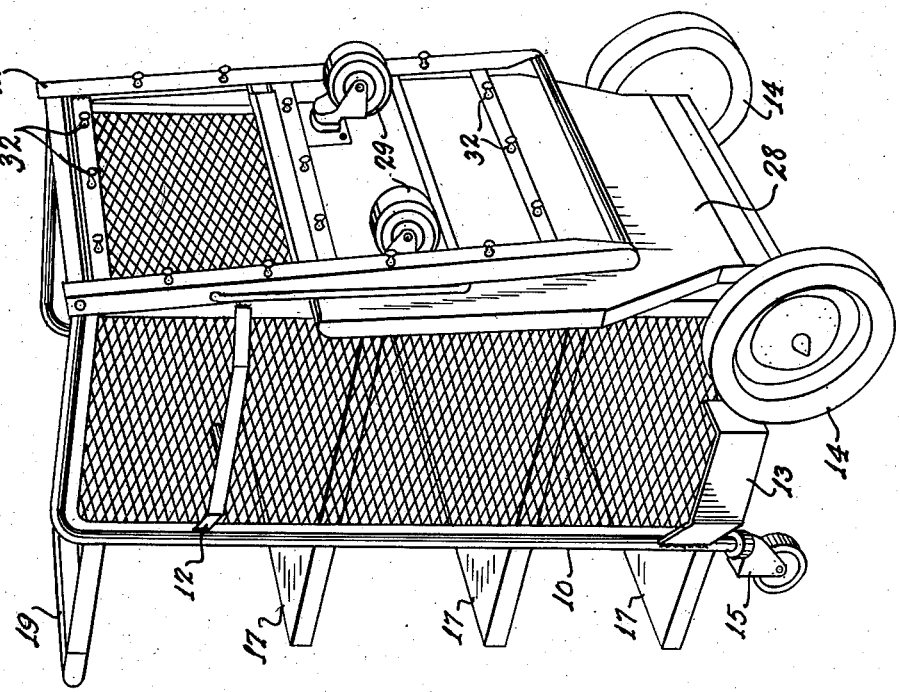
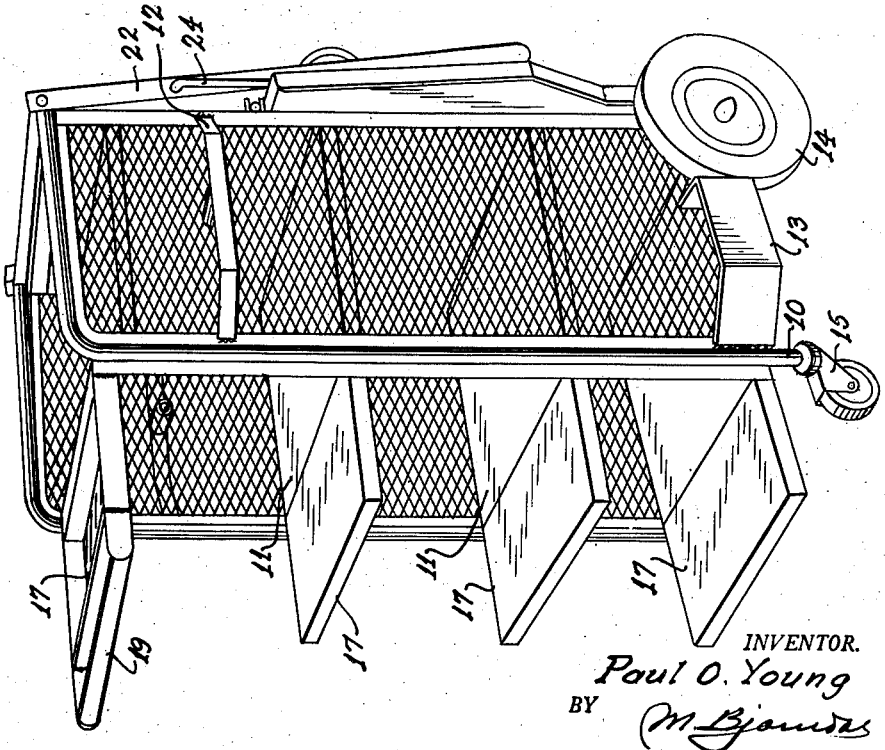
INVENTOR.
Paul O. Young
BY
ATTORNEY.

May 29, 1951 P. O. YOUNG 2,555,178
FOLDING MAID SERVICE TRUCK

Filed June 15, 1949 3 Sheets-Sheet 3

INVENTOR.
Paul O. Young
BY
M. Bjorndal

ATTORNEY.

Patented May 29, 1951

2,555,178

UNITED STATES PATENT OFFICE 2,555,178

FOLDING MAID SERVICE TRUCK

Paul O. Young, Norristown, Pa.

Application June 15, 1949, Serial No. 99,224

3 Claims. (Cl. 280—36)

This invention relates to improvements in folding maid service trucks for use hotels or the like.

Service trucks of the type commonly found in hotels are large and cumbersome and require considerable storage space, which is usually not available in older hotels. They are also as a rule difficult and heavy to move, especially if they have to be moved over steps or inclines as is often necessary where one floor may be on different levels. In the present invention I have eliminated all these difficulties by producing a truck which by its unique construction can be collapsed into about one fourth its open size. In addition its novel construction, as will be hereinafter detailed, permits easier movement over steps and inclines and at the same time it contains all the elements required for the service intended.

An important object of my invention is to provide a maid service truck which will be collapsible into a fraction of its unfolded size thereby permitting storage in small closets.

A further object of my invention is to provide a maid service truck which is of light, inexpensive construction and which may easily be moved over steps and inclines.

Other objects and advantages of my invention will be apparent during the course of the following description. In the accompanying drawings, forming a part of this specification, and in which like numerals are employed to designate like parts throughout the same, Figure 1 is a perspective view of a maid service truck embodying my invention, shown in its fully collapsed position, Figure 2 is a perspective view of the same truck with the shelf element pulled out, Figure 3 is another perspective view of the same truck with the shelf element hooked on, Figure 4 is a perspective view of the same truck as shown in Fig. 3 but from the rear of same, and, Figure 5 is a perspective elevation of the truck in its fully unfolded position.

In the drawings, wherein for the purpose of illustration, is shown a preferred embodiment of my invention, the numeral 10 designates the basic frame of the truck which is of welded construction with said frame 10 consisting of a combination of pipes and angles welded together to form a sturdy and rigid structure. In the frame 10 are arranged four shelves which are welded to the frame 10 and thus serve to stiffen and strengthen the frame in addition to their use as shelves. On one side of the frame are welded the steel strap 12 and the receptacle 13 which together serve to hold the brooms when not in use as illustrated in Fig. 5. The same structure is also placed on the other side of the truck affording additional space for mops and other tools. The frame 10 is mounted on a pair of wheels 14 and on the swivel casters 15 which permit easy steering around corners and through doors, etc. The two sides of the frame 10 are covered with expanded metal 16 which is welded to the frame.

For the purpose of providing additional shelf space there is provided a separate shelf element with four shelves 17 welded to frame 18, see Figures 1 to 4. The shelf element or assembly is provided with a special hook 20 which extends across the back of same, see Figures 1 and 2, and by means of which the shelf assembly may be hooked onto and supported by the steel member 21 of the frame 10, see Fig. 2. When hooked on in this position the shelf assembly projects outwardly in its service position as indicated in Figures 3, 4 and 5. When it is desired to collapse the truck the shelf assembly is unhooked from member 21 and is reversed and inserted into the truck as illustrated in Figures 1 and 2. A handle-bar 19 is fastened across the top shelf 17 of the shelf assembly and when this assembly is hooked onto the truck as shown in Figures 3, 4 and 5 said handle bar is in a convenient position for pushing the truck along.

On the rear side of the truck are two folding elements the top one of which is the frame 22 which is hinged at one end to the upper rear edge of the truck. This frame 22 has a second handle-bar 23 fastened across its rear end and is supported in its open position by the U-shaped supporting bar 24 which in open position rests in the special angle support 25. The frame 22 supports sacks 26 and 27 which are used for dirty linen and refuse respectively. It also holds the handle of the carpet sweeper as shown in Figure 5.

The lower folding element on the rear side of the truck consists of the articulated tail 28 which is hinged to the lower rear edge of the truck. When in closed position this articulated tail is held by the frame 22 which is folded down over it and when in the open position it rests upon a pair of swivel casters 29 thus forming a very flexible and easily maneuvered assembly. This articulated tail serves to support such items as the carpet sweeper 30 and pail 31 as illustrated in Figure 5. The articulated tail is of particular value in maneuvering through winding corridors and over inclines and steps. In such places an ordinary hand truck becomes very difficult to handle for one person especially if it is, as usually is the case, loaded down with pails, carpet sweeper, vacuum cleaner, brooms, clean and dirty linen, etc. Under such conditions the present truck is greatly superior over all formerly known trucks of this type.

The operation of the collapsible maid service truck is as follows: As has been mentioned supra the present truck can be folded into a fraction of its open size which is of exceedingly great value in practical use of same. It has been shown that the unit may be folded by swinging the articulated tail upwards against the rear side of the truck and folding the frame 22 down over said tail 28 thus locking it in its closed position. The shelf assembly on the front of the truck may be unhooked and reversed and inserted with the shelves 17 resting upon the shelves 11 of the truck frame. The shelf assembly thus disappears entirely into the frame of the truck proper. In use the shelves are open and contiguous with the fixed shelves 11 of the truck body thus affording ample space for the various kinds of clean linen and supplies which are carried on the truck. As mentioned supra the articulated tail is of invaluable service in moving the truck on inclines, over steps and in narrow corridors and over obstructions.

It is to be understood that the form of my invention, herewith shown and described, is to be taken as a preferred example of the same, and that various changes in the shape, size and arrangement of parts may be resorted to without departing from the spirit of my invention, or the scope of the subjoined claims.

Having thus described my invention, I claim:

1. A collapsible maid service truck of the character described comprising a body frame having a plurality of fixed shelves; a pair of wheels mounted on the lower rear edge of said frame; a pair of swivel casters mounted on the front of said frame; a folding shelf assembly removably supported on the front of said frame; a folding frame hingedly fastened to the upper rear edge of said frame, and an articulated tail hinged to the lower rear edge of the frame.

2. A collapsible maid service truck of the character described comprising a body frame having a plurality of fixed shelves; a pair of wheels mounted on an axle fastened to the lower rear edge of said frame; a pair of swivel casters rotatably mounted one on each of the lower front corners of the frame; a shelf assembly comprising a fixed frame with a similar number of projecting shelves to that of the main truck frame, said shelf assembly being removably hooked onto the front side of the truck frame; a plurality of means fastened on both sides of said truck frame in which brooms and mops may be supported; a folding frame hingedly fastened to the upper rear edge of said truck frame, said frame having a locking bar by which it may be locked in its open position, and an articulated tail piece hinged to the lower rear edge of said truck frame and supported upon a pair of swivel casters.

3. A collapsible maid service truck of the character described comprising a metallic body frame of welded construction, said frame having a plurality of fixed shelves welded into and forming an integral part of said frame; a pair of wheels mounted on an axle fastened to the lower rear edge of said frame; a pair of swivel casters rotatably mounted, one on each on two tubular metallic members forming the front corners of said body frame; a shelf assembly having a similar number of shelves to that of the main frame and fitted with a hook for hooking onto the front of said body frame; a folding frame hingedly fastened to the upper rear edge of said body frame, said folding frame having a locking bar holding same in its open position and button means for supporting a plurality of bags; and an articulated tail piece hinged to the lower rear edge of said body frame and supported upon a pair of swivel casters mounted under said tail.

PAUL O. YOUNG.

REFERENCES CITED

The following references are of record in the file of this patent:

UNITED STATES PATENTS

| Number | Name | Date |
| --- | --- | --- |
| 2,490,588 | Frie et al. | Dec. 6, 1949 |